US008038961B2

(12) United States Patent
Sonnenschein et al.

(10) Patent No.: US 8,038,961 B2
(45) Date of Patent: Oct. 18, 2011

(54) APPARATUS AND PROCESS FOR PREPARING SILANES (75) Inventors: Raymund Sonnenschein, Frankfurt am Main (DE); Peter Adler, Rheinfelden (DE); Tim Pöpken, Friesoythe (DE); John Kahsnitz, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 984 days.

(21) Appl. No.: 11/575,226

(22) PCT Filed: Jul. 21, 2005

(86) PCT No.: PCT/EP2005/053544
§ 371 (c)(1),
(2), (4) Date: Oct. 12, 2007

(87) PCT Pub. No.: WO2006/029930
PCT Pub. Date: Mar. 23, 2006

(65) Prior Publication Data
US 2008/0095691 A1    Apr. 24, 2008

(30) Foreign Application Priority Data
Sep. 17, 2004  (DE) .................. 10 2004 045 245

(51) Int. Cl.
B01J 8/02      (2006.01)
C01B 33/107    (2006.01)
(52) U.S. Cl. ........ 422/211; 422/610; 422/630; 422/631; 423/342; 203/29; 203/DIG. 6
(58) Field of Classification Search .................. 422/211, 422/610, 630, 631; 423/342; 203/29, DIG. 6
See application file for complete search history.

(56) References Cited

U.S. PATENT DOCUMENTS

| | | | | |
|---|---|---|---|---|
| 2,220,009 A | * | 10/1940 | Youker | .................. 196/132 |
| 4,307,254 A | * | 12/1981 | Smith, Jr. | .................. 568/697 |
| 4,676,967 A | | 6/1987 | Breneman | |
| 5,026,533 A | | 6/1991 | Matthes et al. | |
| 5,094,831 A | | 3/1992 | Klockner et al. | |
| 5,637,777 A | * | 6/1997 | Aittamaa et al. | .............. 568/697 |
| 5,866,721 A | | 2/1999 | Hofen et al. | |

(Continued)

FOREIGN PATENT DOCUMENTS

DE        100 17 168        10/2001

(Continued)

OTHER PUBLICATIONS

U.S. Appl. No. 12/088,286, filed Mar. 27, 2008, Adler, et al.

(Continued)

Primary Examiner — Jennifer A Leung
(74) Attorney, Agent, or Firm — Oblon, Spivak, McClelland, Maier & Neustadt, L.L.P.

(57) ABSTRACT

Provided is an apparatus for preparing silanes of the general formula $H_nSiCl_{4-n}$ where n=1, 2, 3 and/or 4 by dismutation of a chlorinated silane in the presence of a catalyst, wherein the apparatus includes: a distillation column having a column bottom, a column top, at least one feed inlet, a plurality of product offtakes, and a chimney tray; and a side reactor containing a catalyst bed having an upper edge, the side reactor being connected to the distillation column via at least three pipes including a first pipe, a second pipe, and a third pipe.

22 Claims, 6 Drawing Sheets

U.S. PATENT DOCUMENTS

| | | |
|---|---|---|
| 6,423,859 B1 | 7/2002 | Alig et al. |
| 6,852,301 B2 | 2/2005 | Block et al. |
| 6,942,844 B2 | 9/2005 | Muller et al. |
| 7,658,900 B2 | 2/2010 | Berthold et al. |
| 2004/0091630 A1 | 5/2004 | Sonnenschein |
| 2005/0014922 A1 | 1/2005 | Muller et al. |
| 2005/0192460 A1 | 9/2005 | Pascaly et al. |
| 2007/0251447 A1 | 11/2007 | Muller et al. |
| 2008/0289690 A1 | 11/2008 | Sonnenschein et al. |
| 2010/0151400 A1 | 6/2010 | Troll et al. |
| 2010/0266489 A1 | 10/2010 | Rauleder et al. |

FOREIGN PATENT DOCUMENTS

| | | |
|---|---|---|
| DE | 100 57 521 | 5/2002 |
| EP | 0 093 640 | 11/1983 |
| EP | 0 474 265 | 3/1992 |

OTHER PUBLICATIONS

U.S. Appl. No. 10/581,458, filed Jun. 1, 2006, Adler, et al.
U.S. Appl. No. 10/587,399, filed Jul. 27, 2006, Poepken, et al.
U.S. Appl. No. 11/575,226, filed Mar. 14, 2007, Sonnenschein, et al.
U.S. Appl. No. 11/569,774, filed May 10, 2005, Sonnenschein, et al.
U.S. Appl. No. 11/569,783, filed May 10, 2005, Sonnenschein, et al.
U.S. Appl. No. 12/744,204, filed May 21, 2010, Rauleder, et al.
U.S. Appl. No. 13/062,431, filed Mar. 4, 2011, Troll, et al.

* cited by examiner

APPARATUS AND PROCESS FOR PREPARING SILANES

The invention relates to an apparatus and a process for preparing silanes of the general formula $H_nSiCl_{4-n}$ where n=1, 2, 3 or 4 by dismutation of more highly chlorinated silanes in the presence of a catalyst, with the apparatus used for the process being based on a combination of at least one distillation column and at least one side reactor, i.e. an external reactor.

The dismutation reaction is employed, for example, for the preparation of dichlorosilane (DCS, $H_2SiCl_2$) from trichlorosilane (TCS, $HSiCl_3$) with formation of silicon tetrachloride (STC, $SiCl_4$) as coproduct. Another example is the preparation of monosilane ($SiH_4$) from TCS, which likewise results in formation of STC as coproduct.

Such catalytic processes for the preparation of silanes having a low degree of chlorination, e.g. monosilane or DCS, from more highly chlorinated silanes, in general TCS, are widely used in industry. In these, an exchange of hydrogen and chlorine atoms between two silane molecules generally takes place according to the general reaction equation $$H_xSiCl_{4-x} + H_ySiCl_{4-y} \rightarrow H_{x+1}SiCl_{4-x-1} + H_{y-1}SiCl_{4-y+1} \quad (I)$$

in a dismutation or disproportionation reaction. Here, x can be from 0 to 3 and y can be from 1 to 4. An example of this reaction according to equation (I) is the preparation of DCS from TCS (equation I with x=y=1) (EP 0 474 265).

If a plurality of successive reactions are combined, it is possible to prepare monosilane by dismutation in three steps—starting from trichlorosilane to dichlorosilane, to monochlorosilane and finally to monosilane with formation of silicon tetrachloride (STC):

$$2HSiCl_3 \rightleftharpoons H_2SiCl_2 + SiCl_4 \quad (II)$$

$$2H_2SiCl_2 \rightleftharpoons H_3SiCl + HSiCl_3 \quad (III)$$

$$2H_3SiCl \rightleftharpoons SiH_4 + H_2SiCl_2 \quad (IV)$$

$$4HSiCl_3 \rightleftharpoons SiH_4 + 3SiCl_4 \quad (V)$$

Thus, monosilane is nowadays generally produced from trichlorosilane by dismutation of TCS (e.g. DE 21 62 537, DE 25 07 864, DE 39 25 357, DE 33 11 650, DE 100 17 168, U.S. Pat. No. 3,968,199).

Other processes for preparing monosilane are, for example, the reduction of $SiF_4$ by means of complex metal hydrides (EP 0 337 900) or the reaction routes via hydrogenalkoxysilanes (U.S. Pat. No. 6,103,942).

Catalysts used for the dismutation are usually ion exchangers, e.g. in the form of amino-functionalized polystyrenes (DE 100 57 521), amino-functionalized inorganic supports (EP 0 474 265, EP 0 285 937) or organopolysiloxane catalysts (DE 39 25 357). These can be introduced directly into the column, either as a single bed (DE 25 07 864), in layers (U.S. Pat. No. 5,338,518, U.S. Pat. No. 5,776,320) or in a mesh structure (WO 90/02603). As an alternative, the catalyst can be accommodated in one or more external reactors, with inlets and outlets being connected to various points on the distillation column (U.S. Pat. No. 4,676,967, EP 0 474 265, EP 0 285 937, DE 37 11 444).

Owing to the physical properties of the participating silanes, cf. Table 1, and the often very unfavorable position of the chemical equilibrium in the dismutation reaction, the reaction and the work-up by distillation are generally carried out as an integrated process.

TABLE 1

Physical data for chlorosilanes and monosilane

| Compound | Monosilane | Monochloro-silane | DCS | TCS | STC |
|---|---|---|---|---|---|
| Critical temp. [° C.] | −3.5 | 123 | 176 | 206 | 234 |
| Boiling point at atmospheric pressure [° C.] | −112 | −30 | 8.3 | 31.8 | 57.1 |
| Boiling point at 5 bar [° C.] | −78 | 15 | 60 | 87 | 117 |
| Boiling point at 25 bar [° C.] | −28 | 85 | 137 | 170 | 207 |

The best possible integration of reaction and materials separation here is reactive rectification. The use of structured packing has been proposed for this purpose (DE 198 60 146), but a higher catalyst volume is desirable because of the low reaction rate. This can be provided by means of one or more side reactors. Here, a side stream is taken from the distillation column, fed to the side reactor and brought into contact there with the heterogeneous, fixed catalyst. The product mixture leaving the side reactor is fed back into the distillation column (e.g. DE 40 37 639, DE 100 17 168). However, a disadvantage here is that pumps are usually used to convey the reaction mixture in the plant, i.e. between reactor and column. Owing to the spontaneous flammability of monosilane and monochlorosilane, in particular, a small leak as can easily occur in the case of moving parts can have catastrophic consequences. In addition, moving parts of an apparatus generally have higher maintenance requirements than nonmoving parts. Furthermore, maintenance work involves potential hazards due to the readily flammable or spontaneously flammable reaction products, which need to be minimized.

Another disadvantage of known side reactor concepts is that the respective stream is generally pumped through two heat exchangers, one before and one after the reactor, possibly with heat recovery. This enables the reactor temperature to be controlled independently of the distillation temperature. This is intended, for example, to ensure that a single phase is present in the reactor so that a defined flow prevails in the reactor.

The dismutation reaction is a reaction whose conversion is limited by the chemical equilibrium. This circumstance makes it necessary to separate reaction products from the unreacted starting materials in order to drive the conversion in the overall process to completion.

Figure 6:
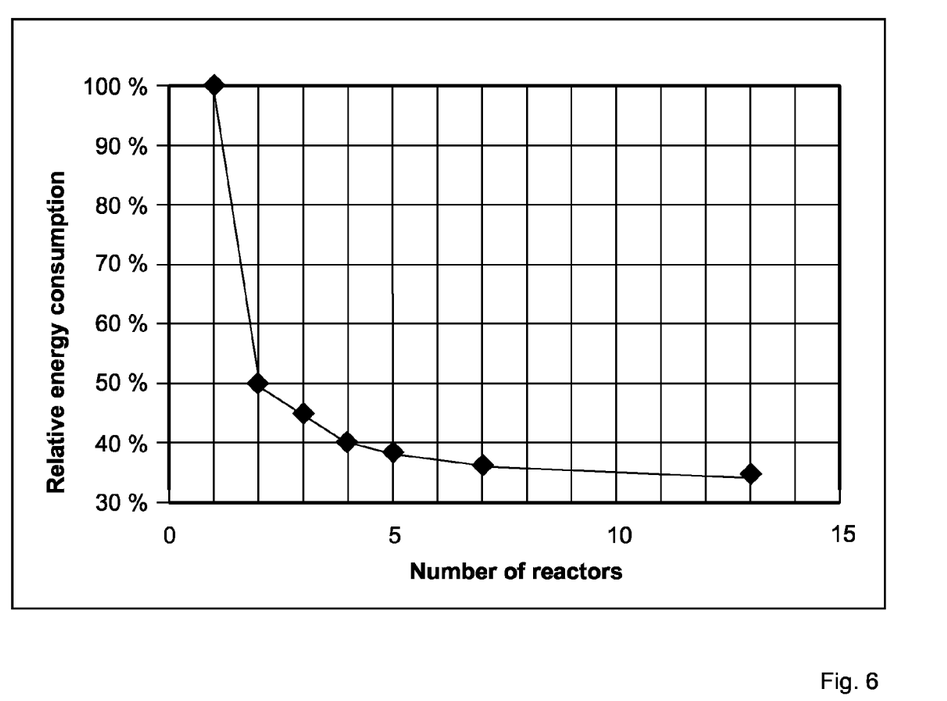

If distillation is chosen as separation operation, which is a possibility due to the position of the boiling points, cf. Table 1, the energetically ideal apparatus would be an infinitely high distillation column in which achievement of chemical equilibrium is ensured on each tray or each theoretical plate by means of a suitable catalyst or an appropriately long residence time. This apparatus would have the lowest possible energy requirement and thus have the lowest possible operating costs [cf. FIG. 6 and also Sundmacher & Kienle (Editors), "Reactive distillation", Verlag Wiley-VCH, Weinheim 2003].

A further disadvantage of known processes, apparatuses and side reactors such as reaction zones integrated into the column is the difficulty of replacing the catalyst. In the preparation of silanes having a low degree of chlorination, the catalyst is inevitably contaminated with these substances and has to be freed of them completely before replacement is possible. In known apparatuses, this cannot be carried out without problems because of the difficulty of passing a cleaning agent, e.g. nitrogen, in a defined manner through the catalyst beds. In addition, the replacement itself suffers from considerable difficulties.

It is therefore an object of the invention to provide a further possibility for the production of, in particular, silanes having a low degree of chlorination and also monosilane on the basis of reactors and distillation columns. In achieving this object, the above-mentioned disadvantages in particular should be substantially avoided.

This object has been achieved according to the invention as set forth in the claims.

Figure 1:
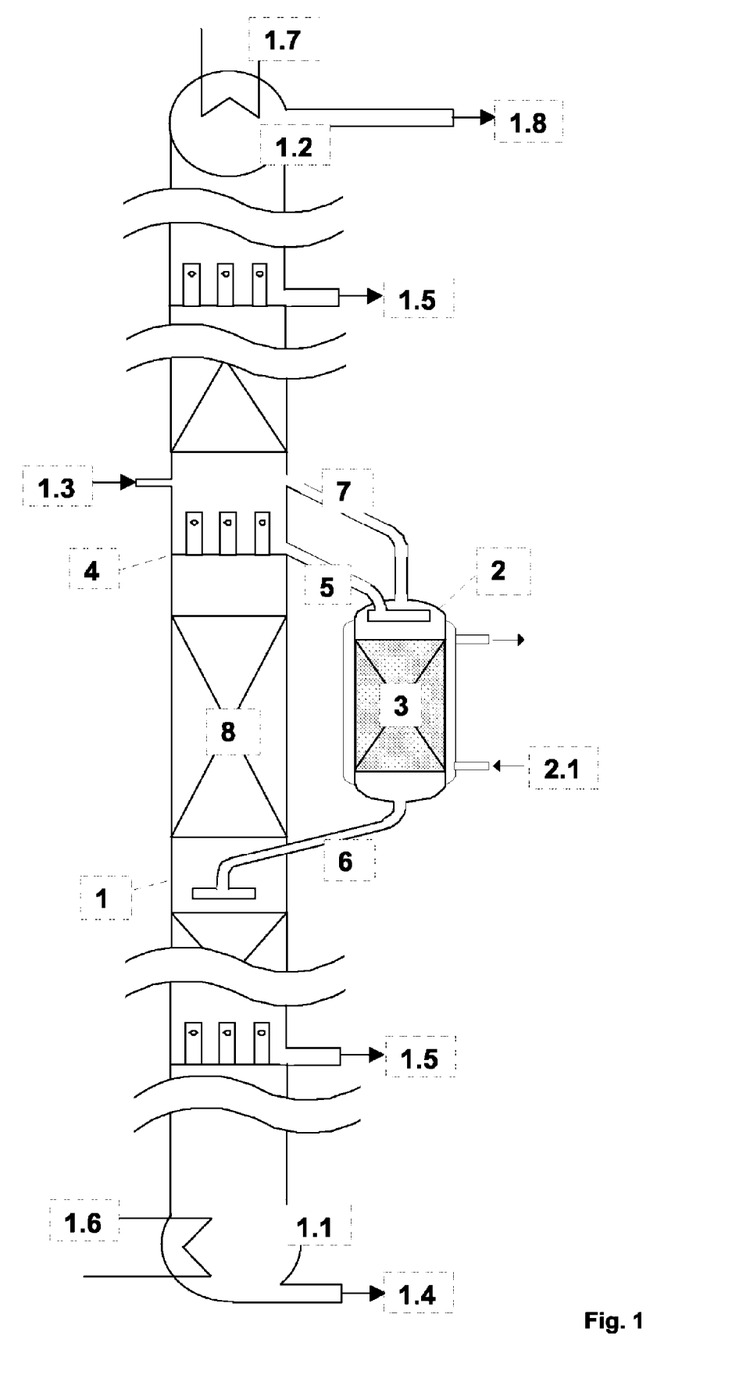

Thus, it has surprisingly been found that silanes having a low degree of chlorination and also monosilane can be prepared from more highly chlorinated silanes, in particular from trichlorosilane and/or dichlorosilane, in the presence of a catalyst in a simple and economical manner even without a pump for conveying streams between column and reactor when an apparatus, cf., for example, FIG. 1, which is based on at least one distillation column (1) having a column bottom (1.1) and a column top (1.2), at least one side reactor (2) with catalyst bed (3), at least one feed inlet (1.3), a product offtake (1.4) and at least one further product offtake (1.5 or 1.8), where the distillation column (1) is provided with at least one chimney tray (4) and at least one side reactor (2) is connected to the distillation column (1) via at least three pipes (5, 6, 7) in such a way that the connection point of the line (5) to the distillation column (1) for the discharge of the condensate from the chimney tray (4, 4.1) is at a higher level than the upper edge of the catalyst bed (3, 3.1 or 3.2), the line (6) for the discharge of the liquid phase from the side reactor (2) opens (6.1) into the distillation column (1) below the chimney tray (4) and this opening (6, 6.1) is at a lower level than the upper edge of the catalyst bed (3, 3.1 or 3.2) and the line (7) for the discharge of the gas phase from the associated side reactor (2) opens (7.1) into the distillation column (1) above the level (4.1) of the chimney tray (4), is used for this purpose.

An apparatus according to the invention can advantageously be equipped with a heatable column bottom (1.6, 1.1) and also low-temperature cooling (1.7) in the column top (1.2). Furthermore, the column (1) can advantageously be provided with at least one column packing (8) and have at least one additional feed inlet (1.3) or product offtake (1.5).

Both the reaction and the separation of liquid and gaseous phases present can be carried out advantageously and comparatively easily in such an apparatus.

In the present apparatus, it is also possible to dispense with heat exchangers before and after the reactor.

In addition, such an apparatus displays high reliability and is comparatively simple to control and maintain.

Furthermore, an apparatus of the present type allows simple start-up and operation of the process.

In addition, the catalyst can be replaced in a controlled and comparatively simple fashion in the present apparatus.

The plant can also be emptied largely unproblematically.

The present invention accordingly provides an apparatus for preparing silanes of the general formula $H_nSiCl_{4-n}$ where n=1, 2, 3 and/or 4 by dismutation of at least one relatively highly chlorinated silane in the presence of a catalyst, which is based on at least one distillation column (1) having a column bottom (1.1) and a column top (1.2), at least one side reactor (2) with catalyst bed (3), at least one feed inlet (1.3), a product offtake (1.4) and at least one further product offtake (1.5 or 1.8), where the distillation column (1) is provided with at least one chimney tray (4) and at least one side reactor (2) is connected to the distillation column (1) via at least three pipes (5, 6, 7) in such a way that the connection point of the line (5) to the distillation column (1) for the discharge of the condensate from the chimney tray (4, 4.1) is at a higher level than the upper edge of the catalyst bed (3, 3.1 or 3.2), the line (6) for the discharge of the liquid phase from the side reactor (2) opens (6.1) into the distillation column (1) below the chimney tray (4) and this opening (6, 6.1) is at a lower level than the upper edge of the catalyst bed (3, 3.1 or 3.2) and the line (7) for the discharge of the gas phase from the associated side reactor (2) opens (7.1) into the distillation column (1) above the level (4.1) of the chimney tray (4).

FIGS. 1, 2, 3, 4 and 5 show preferred embodiments of apparatuses according to the invention. The engineering design of the components present here, e.g. column, reactors with catalyst bed, lines, valves, coolers, heating, separation packing, etc., is known per se.

An apparatus according to the invention is preferably based on more than one reactor unit. Thus, in an apparatus according to the invention, preference is given to two, three, four or five reactor units, with one reactor unit comprising at least the subunits (2), (3), (4), (5), (6) and (7). An apparatus according to the invention is particularly preferably based on two or three such reactor units. It is also possible for two or three reactors (2, 3) connected in parallel to be present per reactor unit.

Full conversion at a low energy consumption can advantageously be achieved at a high specific throughput in plants designed according to the invention.

To ensure a sufficient residence time over the catalyst for the relatively slow dismutation reaction, i.e. to ensure a sufficiently low space velocity over the catalyst for chemical equilibrium to be approximately attained, the space requirement for the reaction is generally greater than for the distillation. For this reason, the reactors (2) used should advantageously be dimensioned so that 80-98% of equilibrium conversion, i.e. the maximum achievable conversion, can be achieved therein.

Apparatuses according to the invention are also advantageous because existing side reactors can relatively easily be provided with a distillation column afterwards according to the invention.

Apparatuses according to the invention are generally equipped with a catalyst bed (3) located in the side reactor (2). It is possible to use known dismutation catalysts and these can be present in the catalyst bed in a loose or ordered form. Preference is given to the catalyst being present in the catalyst bed (3) in a structured mesh packing or in packing elements made of mesh or the catalyst bed (3) comprising packing elements or internals made of catalytically active material. Furthermore, at least one screen tube or a support grating with screen can be present in the catalyst bed (3), as a result of which an additional cross section and thus essentially unhindered gas and liquid flows can advantageously be ensured.

Preferred dismutation catalysts are, for example but not exclusively, a macroporous ion-exchange resin having tertiary amino groups or a porous support which has been modified or impregnated with at least one alkylaminotrialkoxysilane.

Figure 3:
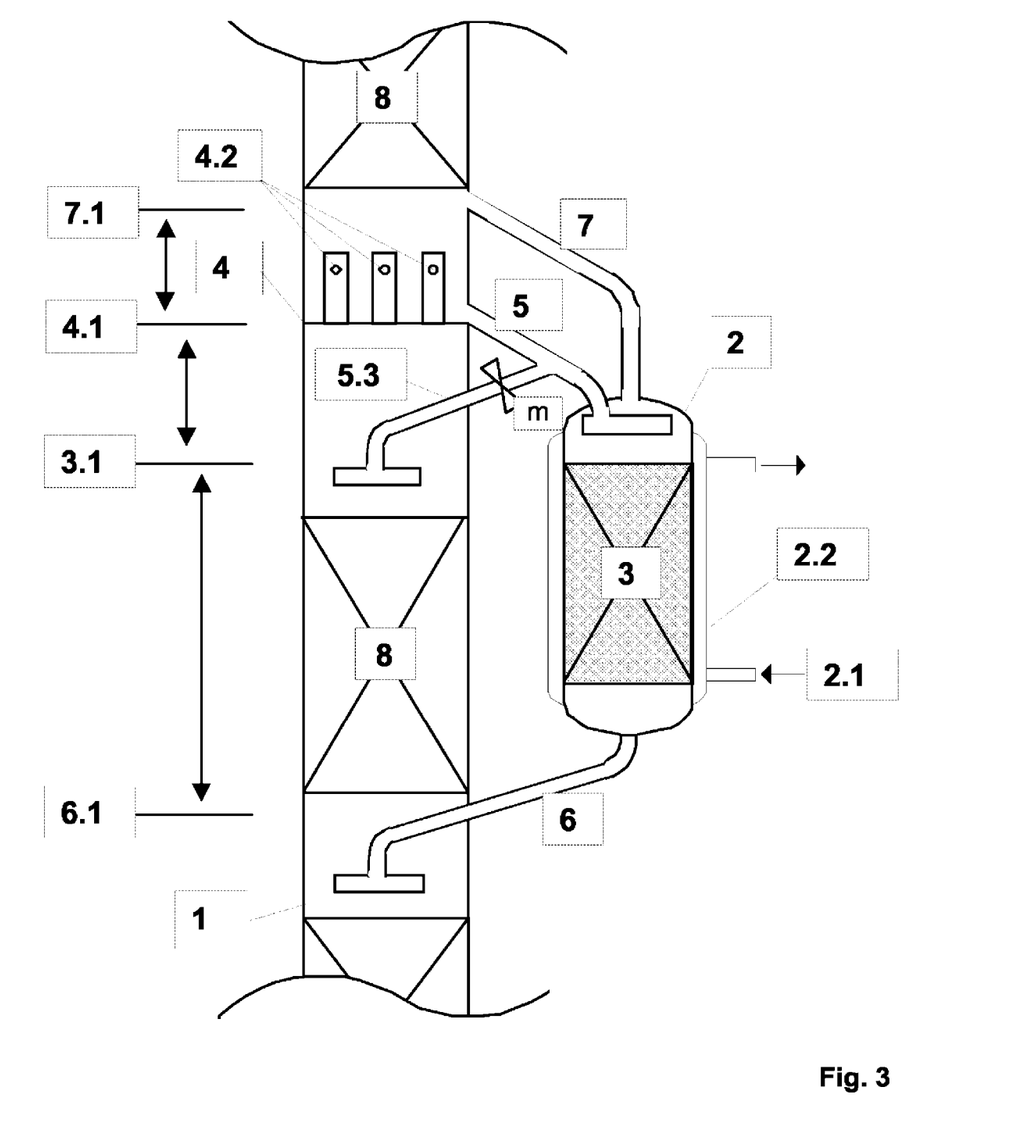
Figure 4:
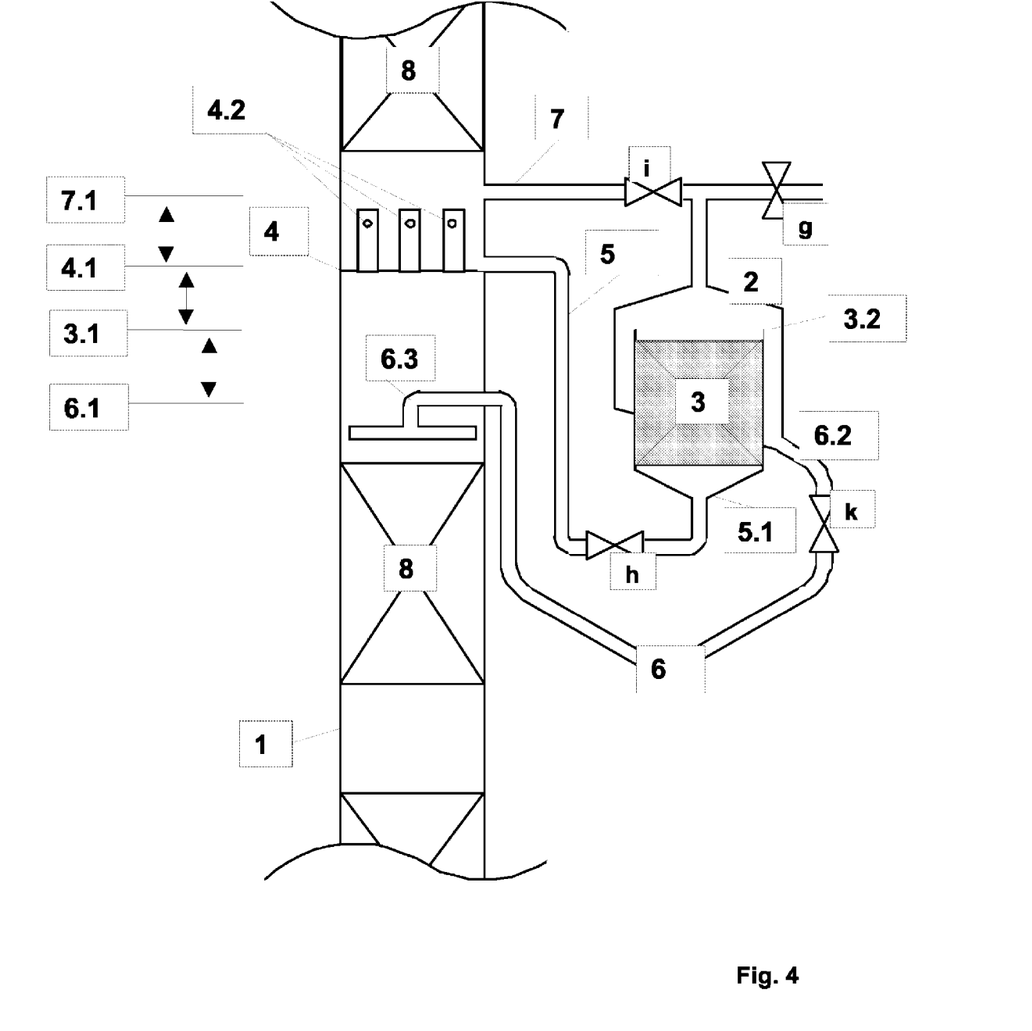
Figure 5:
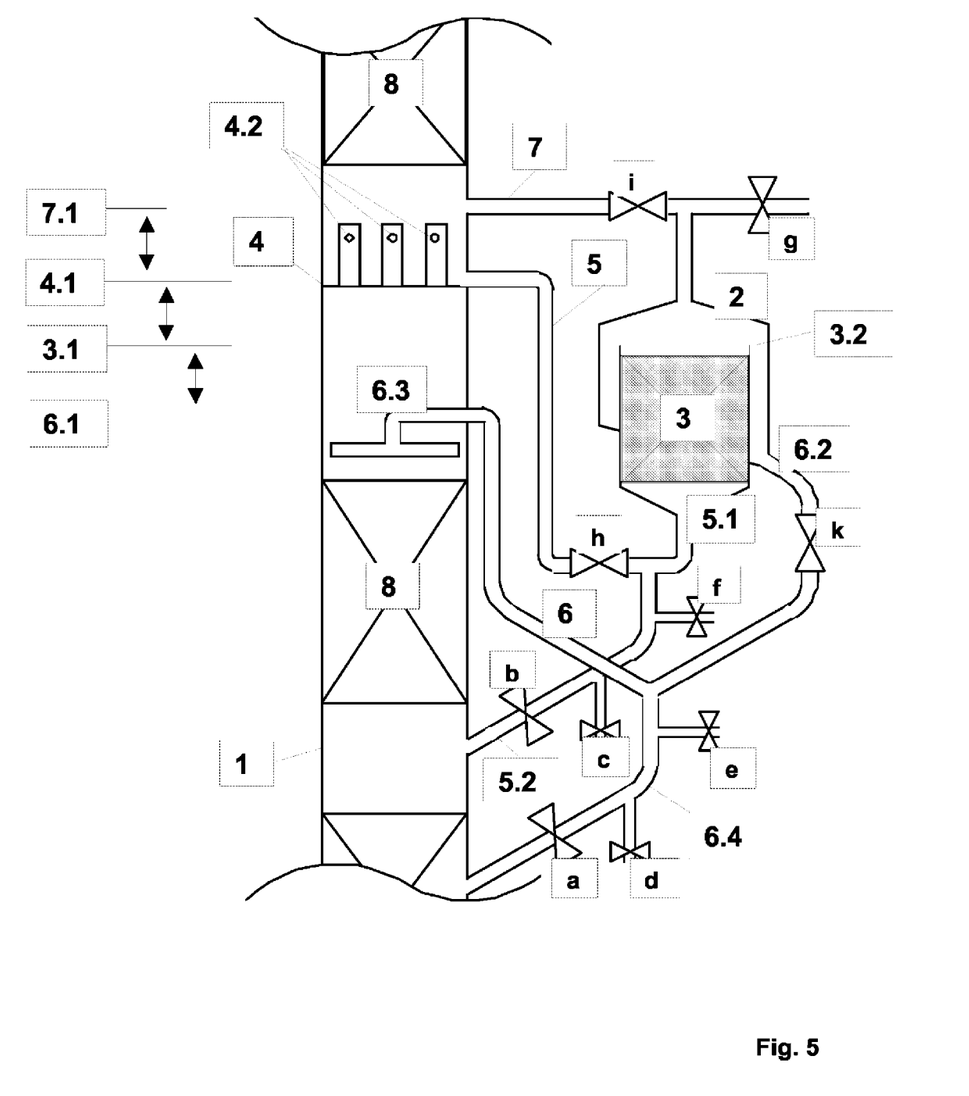

Furthermore, apparatuses according to the invention can advantageously be equipped with additional lines and control units for the filling, operation, emptying and flushing of the respective operating units, cf., in particular, valves a) to k) in FIGS. 3, 4 and 5.

This makes it possible, for example, on the basis of FIG. 4, to close the valves i) and subsequently h) and to flush and dry the side reactor (2) including catalyst (3) with dry nitrogen or argon. Valve k) can subsequently be closed and the catalyst can be taken out or replaced under protective gas. The reactor can subsequently be advantageously brought back into operation by closing valve g) and opening the valves i), k) and h) virtually without any great interruption to operation of the plant.

Start-up or filling of a plant with relatively highly chlorinated silane as starting material and the introduction of starting material during operation of the plant can, for example, be carried out via the valves g), f), e), c), d), a), b), (1.3) and/or the column bottom (1.1), cf. FIGS. 1, 3, 4 and 5.

In addition, product can be taken off via the column top (1.8), offtake (1.5) and/or the column bottom (1.4) during operation of the plant according to the invention.

The present invention also provides a process for preparing silanes of the general formula $H_nSiCl_{4-n}$ where n=1, 2, 3 and/or 4 by dismutation of a higher chlorosilane in the presence of a catalyst at a temperature in the range from −120 to 180° C. and a pressure of from 0.1 to 30 bar abs. in an apparatus according to the invention, which comprises filling the apparatus at least up to a height of a catalyst bed with a liquid hydrogenchlorosilane so that the chlorosilane comes into contact with the catalyst, preferably so that the catalyst is completely or partly wetted with liquid, and introducing starting material continuously via a column inlet in an amount corresponding to the amount of product discharged from the system. The starting material can be fed directly into the column (1.3), in particular into the middle section of the column, and/or into at least one of the side reactors (2) or via the bottom (1.1), in particular during start-up. In general, the reaction commences when catalyst and starting material come into contact with one another.

The catalyst bed of a side reactor is preferably operated at a temperature of from −80 to 120° C. in the process of the invention. The reactor temperature or catalyst bed temperature can advantageously be regulated or controlled (2.1) by means of a cooling or heating jacket on the reactor.

Furthermore, the flow into the catalyst bed (3) can either be from above, cf. FIGS. 1, 2 and 3, or from below, cf. FIGS. 4 and 5.

Figure 2:
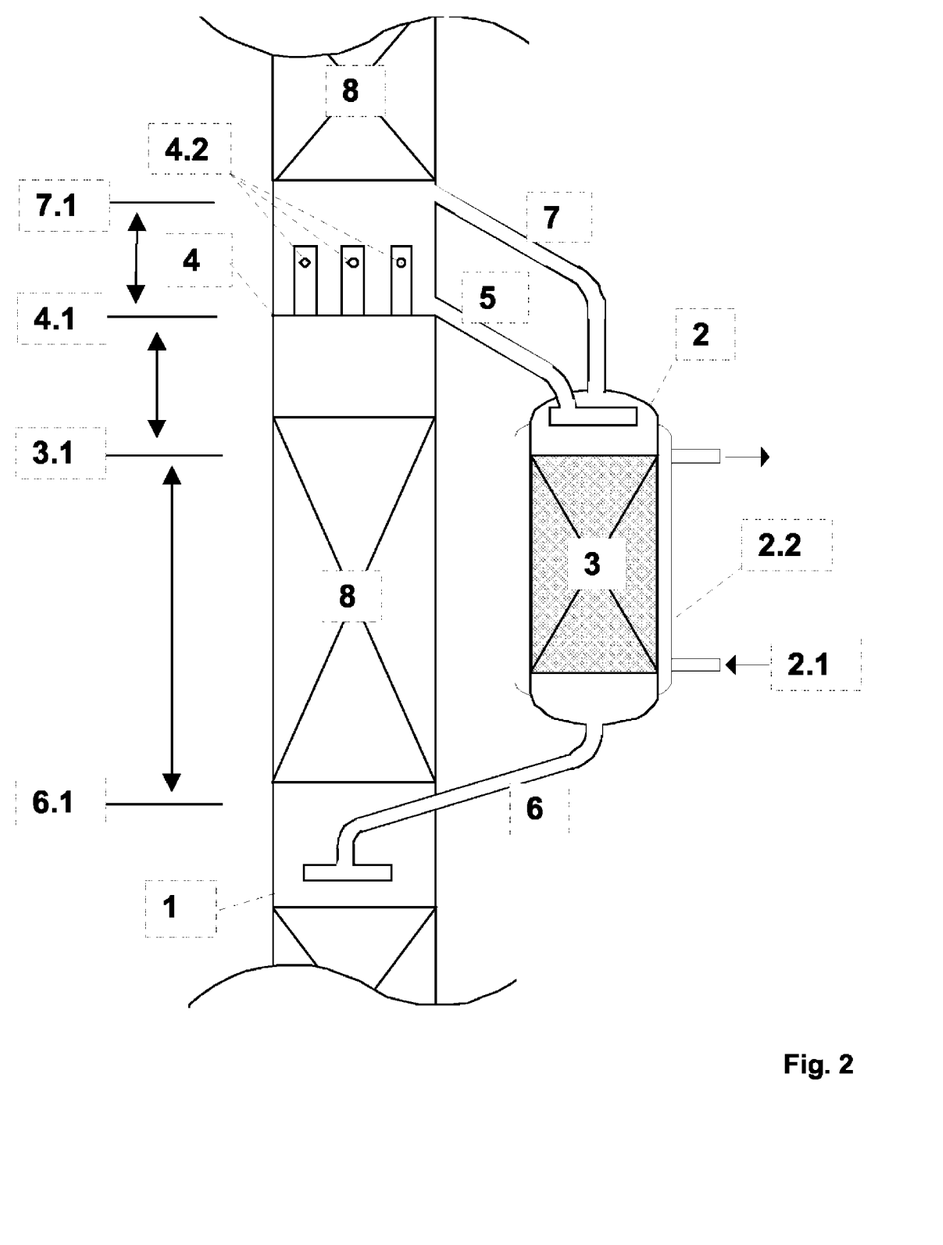

If the liquid phase is fed in from above, cf. FIGS. 1, 2 and 3, it generally flows downward from one chimney tray (4) via line (5) and is distributed over the upper part of the catalyst bed (3).

If inflow is from below, it is possible to select a configuration of the apparatus as can advantageously be derived from FIG. 4 or 5, where the side reactor (2), the catalyst bed (3), the pipes (5), (6) and (7) are arranged in relation to the chimney tray (4) and the column (1) in such a way that the flow (5.1) to the catalyst bed (3) is from below via line (5). In this case, the liquid phase from the chimney tray (4) can also run out and flow from below into the catalyst bed (3) via line (5) owing to the hydrostatic pressure (cf. the height differences between the levels 6.1, 3.1, 4.1 and 7.1). The chlorosilane of the liquid phase thus comes into contact with the catalyst and reacts according to the reaction equations (II), (III) and/or (IV). Gaseous reaction product can also ascend via line (7) into the column (1) and there, if applicable, pass through the units (8) and (4.2), partially condense or be separated. Liquid phase is generally recirculated to the column via line (6). Furthermore, the flow of liquid phase to the reactor or to the column can additionally be regulated via line (5.2, cf. 5.3 in FIG. 3).

The specific requirements which such a reactor has to meet because of the properties of the reaction and the participating substances are described below.

As stated above, the handling and processing of silanes of the general formula $SiH_xCl_{4-x}$ is very demanding from a safety point of view, since chlorine-containing silanes form toxic hydrogen chloride on contact with atmospheric moisture and also produce solid silicon dioxide deposits which can block the plant components. In addition, hydrogen-containing silanes are combustible and become increasingly readily flammable with decreasing chlorine content. Dichlorosilane, for instance, can ignite spontaneously and monosilane reacts immediately with atmospheric oxygen, with explosive mixtures being able to be formed as a result of delayed commencement of the reaction despite the spontaneous flammability. For this reason, contact of the reaction mixture with air and water is to be avoided. This is appropriately achieved by avoidance of possible points of leakage and minimization of the need for maintenance work.

According to the invention, the hydrostatic height from the outlet or column tray (4) of the column (1) is advantageously utilized instead of a pump to convey the reaction mixture through the reactors (2). This hydrostatic height can, according to the invention, be provided either within or outside the column in the form of downcomers. In this way, the reaction mixture can flow freely under gravity and there is no longer a need for moving parts within the region coming into contact with product, cf. (3.1), (4.1), (6.1) and (7.1) in FIGS. 2, 3, 4 and 5. However, since the hydrostatic height is able to build up only a comparatively small pressure difference, the flow resistance in the reactors should advantageously be kept low.

A further advantageous property of the present system is that an intermediate-boiling component, e.g. DCS, forms a lower-boiling component, in the present case MCS, and a higher-boiling component, here TCS, in the reaction. Furthermore, it has surprisingly been found that a certain amount of gas is formed in the reactors for this reason. This gas additionally has the advantageous property that small bubbles become attached to the catalyst particles and consequently reduce the free cross section of the catalyst bed available to the liquid.

In an apparatus according to the invention, additional heating or cooling of the distillation region of the column at the height of the reactor unit or units can generally advantageously be omitted. In this case, the apparatus is advantageously operated with a mixture of liquid and gas phases. The temperature resulting in the distillation or reaction is suitable for carrying out the reaction at an absolute pressure of from 0.1 to 30 bar, preferably from 1 to 8 bar. The use of heat exchangers for the inflowing and outflowing product streams of the reactors can thus advantageously be dispensed with.

The problems of gas bubbles becoming attached to the catalyst are, according to the invention, solved in another way, as described below.

The flow direction of the reaction liquid through the reactors can be either from the top downward, cf. FIGS. 1, 2 and 3, or from the bottom upward, cf. FIGS. 4 and 5.

An advantage of the first variant, cf. FIG. 2, is that the catalyst (3) comes into contact with gas and liquid phases. It is known that the reaction proceeds more quickly in the gas phase. However, backing up of the liquid flowing from the column (1) into the reactor (2) could occur if this backing up were not remedied according to the invention by preferably providing sufficient free space, i.e. free cross section, for the flow of gas and liquid in the plant components (2) and (3). This can be achieved, in particular, by means of a specific catalyst configuration or arrangement. Particularly advantageous types of packing are, for example, the Katapak® products from Sulzer Chemtech or Katamax™ from Koch. A further possibility can be the packaging of the catalyst particles in packing elements made of mesh, which can then be introduced as a random bed into the reactor. A further advantageous possibility is the installation of mesh tubes in the reactor which is otherwise filled with a full bed of catalyst, which can likewise aid flow in a particularly advantageous fashion.

Another variant for avoiding backing up in the reactor is for flow into the reactor to occur from below, cf. FIGS. 4 and 5. Here, the gas bubbles are advantageously carried upward and out with the product stream and recirculated separately to the distillation column.

Regardless of the chosen embodiment of the apparatus of the invention, it is advantageous to recirculate the gaseous reaction products to the distillation column separately from the liquid reaction products. This can reduce the loading of the distillation column, since the gas phase is generally recirculated to the column at a higher point than the liquid.

The process of the invention and the novel apparatuses used for this purpose can also advantageously make simple and safe replacement of the catalyst possible. If a basic ion exchanger is used as catalyst, contamination of this catalyst with complex metal or nonmetal ions has to be taken into account. In addition, the life of the catalyst is restricted, inter alia, by the limited thermal stability of the catalyst. The catalyst replacement can be made even easier if the catalyst is used in a cartridge and only the cartridge is removed from the reactor and replaced. As an alternative, the catalyst can be taken from the reactor in flowing form in the moist or dry state and likewise be recirculated.

In the process of the invention, it is advantageous for the number and dimensions of the reactors to be such that the total apparatus can continue to be operated at only slightly reduced load even when one reactor is taken out of operation. This can be achieved, firstly, by duplication of the reactors at the respective position. Secondly, when the plant has at least 2, preferably 3 reactors per reactor unit, it can be dimensioned so that it can continue to be operated at reduced load and with increased energy input.

A practical advantage of this process according to the invention compared to a reactive distillation column having an internally installed catalyst is that when the catalyst is replaced, it is not necessary to replace the entire catalyst packing but instead only replace the catalyst bed which has become deactivated. The overall plant can then continue to be operated, possibly at reduced load.

Before carrying out a replacement, the fresh catalyst is appropriately prepared for use with the air- and moisture-sensitive reaction mixture. Purification of the fresh catalyst can be carried out by washing with purified water and subsequent drying by means of, optionally preheated, nitrogen; the use of extraneous substances such as methanol can be avoided in this way. The catalyst is preferably dried in the installed state, which enables contamination after drying to be avoided.

The exhausted catalyst is saturated with chlorosilanes and can be freed of these before it is removed from the reactor. For this purpose, the reactor (2) can be isolated from the plant by means of filling, regulating or emptying lines as described above, cf. FIGS. 4 and 5, and be freed of liquid present in it. The catalyst can then likewise be dried using, optionally preheated, nitrogen or noble gas such as argon.

Furthermore, it is possible and particularly advantageous (i) to use trichlorosilane as higher chlorosilane in the process of the invention using an apparatus according to the invention and obtain as products essentially monosilane, monochlorosilane, dichlorosilane and tetrachlorosilane or a mixture of at least two of these compounds or (ii) to use dichlorosilane and obtain monosilane, monochlorosilane, trichlorosilane and silicon tetrachloride or a mixture of at least two of these compounds.

The invention claimed is:

1. An apparatus for preparing silanes of the general formula $H_nSiCl_4$, where n=1, 2, 3 and/or 4 by dismutation of at least one chlorinated silane in the presence of a catalyst, wherein said apparatus comprises:
    at least one distillation column comprising a column bottom, a column top, at least one feed inlet, a plurality of product offtakes, and at least one chimney tray; and
    at least one side reactor comprising a catalyst bed having an upper edge, the side reactor being connected to the distillation column via at least three pipes comprising a first pipe, a second pipe, and a third pipe,
    wherein the side reactor, the catalyst bed, the first pipe, the second pipe, and the third pipe are positioned in relation to the chimney tray and the distillation column,
    the first pipe is connected to the distillation column at a position higher than the upper edge of the catalyst bed to discharge a condensate from the chimney tray into the catalyst bed,
    the first pipe comprises a branch pipe which has an opening in the distillation column at a position below the chimney tray and is configured to regulate a flow of the condensate,
    the second pipe is connected to the distillation column at a position below the chimney tray and the upper edge of the catalyst bed to discharge a liquid phase from the side reactor to the distillation column, and
    the third pipe is connected to the distillation column at a position higher than the chimney tray to discharge a gas phase from the side reactor to the distillation column.

2. The apparatus as claimed in claim 1, wherein the column bottom comprises a heatable column bottom.

3. The apparatus as claimed in claim 1, wherein the column top comprises a low-temperature cooling column top.

4. The apparatus as claimed in claim 1, wherein the at least one distillation column and the at least one side reactor form two, three, four or five reactor units, with one reactor unit comprising at least one side reactor with the catalyst bed, at least one chimney tray, and at least three pipes.

5. The apparatus as claimed in claim 4, wherein the at least one side reactor comprises two or three reactors connected in parallel per reactor unit.

6. The apparatus as claimed in claim 1, wherein the distillation column comprises at least one column packing.

7. The apparatus as claimed in claim 1, wherein the plurality of product offtakes comprise two product offtakes.

8. The apparatus as claimed in claim 1, wherein the catalyst bed comprises catalyst in a loose or ordered form.

9. The apparatus as claimed in claim 8, wherein the catalyst bed comprises the catalyst in a structured mesh packing or in packing elements made of mesh, or the catalyst bed comprises packing elements or internals made of catalytically active material.

10. The apparatus as claimed in claim 1, wherein the catalyst bed comprises at least one screen tube or a support grating with screen.

11. The apparatus as claimed in claim 1, wherein the side reactor, the catalyst bed, and the pipes are positioned in relation to the chimney tray and the distillation column in such a way that the first pipe is connected to the catalyst bed at a position below the point where the first pipe is connected to the distillation column.

12. The apparatus as claimed in claim 1, further comprising at least one valve connected to one of the first pipe, the second pipe, and the third pipe.

13. A process for preparing silanes of the general formula $H_nSiCl_4$, where n=1, 2, 3 and/or 4 by dismutation of a higher chlorosilane in the presence of a catalyst at a temperature in the range from −120 to 180° C. and a pressure of from 0.1 to 30 bar abs. in an apparatus as claimed in claim 1, wherein said process comprises:

filling the apparatus at least up to a height of a catalyst bed with a liquid hydrogenchlorosilane so that the chlorosilane comes into contact with the catalyst; and introducing starting material continuously via a column inlet in an amount corresponding to the amount of product discharged from the system.

14. The process as claimed in claim 13, wherein the catalyst used is a macroporous ion-exchange resin having tertiary amino groups or a porous support which has been modified or impregnated with alkylaminotrialkoxysilanes.

15. The process as claimed in claim 13, wherein the catalyst is completely or partly wetted with liquid.

16. The process as claimed in claim 13, wherein the starting material is fed directly into the column and/or into at least one of the side reactors.

17. The process as claimed in claim 16, wherein the starting material is fed into the middle section of the column.

18. The process as claimed in claim 13, wherein the catalyst bed of the side reactor is operated at a temperature of from −80 to 120° C.

19. The process as claimed in claim 13, wherein (i) trichlorosilane is used as higher chlorosilane and essentially monosilane, monochlorosilane, dichlorosilane and tetrachlorosilane or a mixture of at least two of these compounds are obtained as products or (ii) dichlorosilane is used and monosilane, monochlorosilane, trichlorosilane and silicon tetrachloride or a mixture of at least two of these compounds are obtained.

20. The apparatus as claimed in claim 1, wherein the first pipe, the second pipe, and the third pipe are connected with the distillation column at the positions adjusted such that the condensate from the chimney tray flows through the catalyst bed by hydrostatic pressure, instead of a pump.

21. The apparatus as claimed in claim 1, wherein the first pipe connects the chimney tray of the distillation column and a bottom portion of the side reactor, and the second pipe of the side reactor has an overflow provided over the catalyst bed and connected to the distillation column.

22. The apparatus as claimed in claim 1, wherein the third pipe comprises a branch pipe which has an opening in the distillation column at a position lower than the position where the opening of the branch pipe of the first pipe is placed in the distillation column.

* * * * *